(12) United States Patent
Nakane et al.

(10) Patent No.: US 6,291,990 B1
(45) Date of Patent: Sep. 18, 2001

(54) REVOLUTION SENSOR

(75) Inventors: Mitsutoshi Nakane, Hitachinaka; Hiroyuki Ohgi, Hitachi; Ryoichi Kobayashi, Tokai-mura, all of (JP)

(73) Assignees: Hitachi, Ltd., Tokyo; Hitachi Car Engineering Co., Ltd., Hitachinaka, both of (JP)

( * ) Notice: Subject to any disclaimer, the term of this patent is extended or adjusted under 35 U.S.C. 154(b) by 0 days.

(21) Appl. No.: 09/196,248

(22) Filed: Nov. 20, 1998

Related U.S. Application Data

(63) Continuation-in-part of application No. 08/939,440, filed on Sep. 29, 1997, now Pat. No. 6,046,584.

(30) Foreign Application Priority Data

Nov. 20, 1997 (JP) .................................................. 9-319289

(51) Int. Cl.$^7$ ...................................................... G01B 7/14
(52) U.S. Cl. .................................. 324/207.25; 324/207.2
(58) Field of Search ........................... 324/207.2, 207.22, 324/207.25, 207.12, 174, 207.21, 207.11, 207.24, 166

(56) References Cited

U.S. PATENT DOCUMENTS 6,046,584 * 4/2000 Nakane et al. ................... 324/207.22

FOREIGN PATENT DOCUMENTS

| 2-276970 | 11/1990 | (JP) . |
| 3-48715 | 5/1991 | (JP) . |
| 6-123638 | 5/1994 | (JP) . |
| 6-186240 | 7/1994 | (JP) . |
| 8-219709 | 8/1996 | (JP) . |

* cited by examiner

Primary Examiner—Christine Oda
Assistant Examiner—Anthony Jolly
(74) Attorney, Agent, or Firm—Crowell & Moring LLP

(57) ABSTRACT

Electrical connective terminals for an input use and an output use of magneto-electric conversion element and a magnet are insert molded to a synthetic resin holder. At least one part of one end face of magnet is covered by one end of the synthetic resin holder 5. At an outer face of the covering part a circuit board 6 on which the magneto-electric converter element is mounted is installed. The covering part is arranged between the magnet and thr magneto-electric converter element. Thereby a predetermined gap is assured between the magnet and the magneto-electric converter element. When a distance formed between the magnet and the rotor of magnetic material is expressed as L, a distance formed between the magnet and a magnetic sensing part of the magneto-electric converter element is expressed as L1, then L1 equals to $\frac{1}{4}L$–$\frac{3}{4}L$ ($L1=\frac{1}{4}L$–$\frac{3}{4}L$) and the distance L1 is set with a range of 1.5 mm–4.5 mm.

10 Claims, 8 Drawing Sheets

REVOLUTION SENSOR

CROSS REFERENCE TO RELATED APPLICATION

This application is a continuation-in-part of application Ser. No. 08/939,440, filed Sep. 29, 1997, now U.S. Pat. No. 6,046,584

BACKGROUND OF THE INVENTION

The present relates to a revolution sensor using a magneto-electric converter element such as a Hall IC (Hall element) and a magnetic resistance element (MR element), etc..

Until now, a revolution sensor apparatus has known, such a revolution sensor apparatus comprises a magneto-electric converter element such as a Hall IC and a magnet for giving the magnetic field to the magneto-electric converter element. The magneto-electric converter element is arranged between a rotor of magnetic material (for example, a magnetic rotary body having a tooth marked projection member) which forms as a detection rotary body to be subjected to detection and the magnet. A quantitative change of the magnetic field which is caused by the revolution of the rotor of magnetic material is outputted as an electrical signal through the magneto-electric converter element and according to this electric signal the revolution speed (the revolution number) etc. is detected.

In the above stated kind of the revolution sensor apparatus, as the actual mounting embodiments for the magneto-electric converter element and the magnets etc., the various kinds of the revolution sensors have proposed, and further to obtain the good detection sensitivity the various technical proposals about the revolution sensor have devised.

For example, a revolution sensor described in Japanese utility model application laid-open No. Hei 3-48715, each of the elements such as the permanent magnets, a magneto-electric converter element and a circuit board are installed in a cylindrical form case and then these components are protected through the case. Further, between the permanent magnets and a Hall element, by intervening a magnetic pole piece having a share point at a tip end and made by a saturation magnetic flux density material, as a result the magnetic flux is concentrated to the magneto-electric converter element.

In a magnetic field detection apparatus described in Japanese patent application laid-open No. Hei-276970, a groove portion is provided to a connector in which an output pin (an electrical connective terminal) is formed by an insert molding technique, a bypass use magnet is inserted to the above stated groove portion using an adhesive agent and to protect this bypass use magnet is protected an inner case made of a non-magnetic metal is covered to a part of the connector. To a surface of the above stated inner case a mold chip where a magnetic resistance element (MR element) is molded through a resin material is fixed using an adhesive agent, and further to protect this mold chip an outer case is inserted under the pressure state to the connector.

In a moving body detection apparatus described in Japanese patent application laid-open No. Hei 6-123638, a magneto-electric converter element, a processing circuit, magnets for giving the magnetic field to the magneto-electric converter element and a yoke are installed in a cylindrical shape case and also are fixed and held by a filling-up agent where those components are filled up in this cylindrical shape case.

Further, according to the scatters in the magnetic field characteristics of the magneto-electric converter element and the magnets, to cope with a problem about a lowering of the detection sensitivity, before the fill-up of the above stated filling-up agent, the detection apparatus has a means for enable to adjust to the position in which at least one selected from the detection element, the magnets and the yoke has the maximum detection sensitivity. In concretely, by moving and adjusting the yoke on the magnets, the magnetic coupling between a Hall element being the magneto-electric converter element and the magnets is reinforced.

In a magnetic detection apparatus described in Japanese patent application laid-open No. Hei 6-186240, a magnetic resistance element (MR element) performed through a resin molding is held on a resin housing through an element holding member. This resin housing and a cylindrical shape magnet (a bias magnet) provided at a tip portion of the resin housing are covered through a non-magnetic metal cap, accordingly the magnetic resistance element (MR element) is passed through into the cylindrical shape magnet.

Further, to make carry out easily the management of an air gap which is formed between a subject (an object) to be subjected to detection (a rotor of magnetic material) and the magnetic resistance element (MR element), the element holding member for holding the magnetic resistance element (MR element) is compelled to direct for the subject to be subjected to detection. And then the above stated cap (the cap of a detective unit) receives the compelled force (under the condition opposed against the compelled force of the element holding member) and then the molding material of the magnetic resistance element (MR element) is contacted always to an inner face of the cap.

In a revolution position detection apparatus described in Japanese patent application laid-open No.

Hei 8-219709, an electrical connective terminal being a connector pin of a magneto-electric converter element is molded with an insert molding manner technique to a connector one body type resin case and magnets are inserted and fixed to this resin case. To one end of the magnet a circuit board on which the magneto-electric converter element is mounted is fixed, and further one end of the above stated electrical connective terminal is projected from the resin case. This one end of the electrical connective terminal is connected electrically to the circuit board of the magneto-electric converter element and those components (the magneto-electric converter element, the circuit board, a magnet mounting part of the resin case) are covered by a protection cap.

Further, to improve the detection sensitivity of the revolution signal, using a metal material having the strength to the revolution cap of the detection apparatus a cap thickness is made at the minimum, as a result there can afford to have a cap thickness reduction part about a gap length formed between the magnet and the rotor of magnetic material (the subject to be subjected to detection).

As sated in above, in the conventional this kind apparatus, with respect to the actual mounting embodiments (the protection embodiments) of the components such as the magneto-electric converter element, the magnet (for example, a permanent magnet), etc., the various kinds of the embodiments have proposed. Further, to improve the magnetic detection accuracy, there have been the proposals about the technique for heightening the magnetic flux density for passing through the magneto-electric converter element and about the technique for shortening the gap formed between the magnet and the rotor of magnetic material.

However, in this kind revolution sensor (the magnetic detection apparatus, the revolution position detection apparatus), the detection ability is under the control of not only the small size formation of the gap formed between the magnet and the rotor of magnetic material and further the concentration of the magnetic flux for passing through the magneto-electric converter element but also the position relationship among the three elements which are the rotor of magnetic material, the magnet and the magneto-electric converter element. However, in the above stated prior arts the latter problem about the position relationship among the three elements is not referred.

SUMMARY OF THE INVENTION

A first object of the present invention is to provide a revolution sensor wherein as to a position relationship among a rotor of magnetic material, a magnet, and a magneto-electric converter element of this kind of the revolution sensor, by finding out an ideal relationship, it can be supplied effectively a quantitative change amount of the magnetic flux which acts on the magneto-electric converter element such as a Hall element etc., and the accuracy about the revolution detection can be improved.

Further, another object of the present invention is to provide a revolution sensor wherein a rationalization of the actual mounting embodiment of a magnet and a magneto-electric converter element etc., used in the revolution sensor can be improved and a simplification performance of the revolution sensor apparatus, the fixing of the components and the position accuracy can be improved.

To solve the above stated problems, the present invention is constituted basically with following constructions. Further, to understand easily the contents of the present invention, to the constituting elements reference numerals shown in from FIG. 1 to FIG. 6 stated in a latter item will be cited.

A first invention resides in that in a revolution sensor 1 having a magneto-electric converter element 2 and a magnet 3 for giving the magnetic field to said magneto-electric converter element 2, said magneto-electric element 2 is positioned between said magnet 3 and a rotor 20 of magnetic material and the change in the magnetic field caused according to the revolution of said rotor 20 of magnetic material is outputted by said magneto-electric converter element 2 as an electrical signal, the revolution sensor 1 wherein, when a distance formed between said magnet 3 and said rotor 20 of magnetic material is expressed by L, a distance formed between said magnet 3 and a magnetic sensing part 2a of said magneto-electric converter element 2 is expressed by L1, L1 equals to ¼L–¾L (L1=¼L–¾L) and said distance L1 is set with a range of 1.5 mm–4.5 mm.

A second invention resides in that in a revolution sensor 1 having a magneto-electric converter element 2 and a magnet 3 for giving the magnetic field to said magneto-electric converter element 2, the revolution sensor 1 wherein, electrical connective terminals 4a, 4b and 4c for an input use and an output use of said magneto-electric conversion element 2 and said magnet 3 are insert molded to a synthetic resin holder 5, and at least one part of one end face at a side which is arranged oppositely to said magnet 3 with said rotor 20 of magnetic material is covered by one end 5' of said synthetic resin holder 5 and at an outer face of said covering part 5' a circuit board 6 on which said magneto-electric converter element 2 is mounted is installed and further said covering part 5' is intervened between said magnet 3 and said magneto-electric converter element 2, whereby a predetermine gap can be assured between said magnet 3 and said magneto-electric converter element 2, and said electrical connective terminals 4a, 4b and 4c are projected from an end face of said synthetic resin holder 5 at a side of said magnet 3 and is connected electrically to said circuit board 6 of said magneto-electric converter element 2.

A third invention resides in that in a revolution sensor 1 having a magneto-electric converter element 2 and a magnet 3 for giving the magnetic field to said magneto-electric converter element 2, the revolution sensor wherein, electrical connective terminals 4a, 4b and 4c for an input use and an output use of said magneto-electric conversion element 2 and said magnet 3 are insert molded to a synthetic resin holder 5, said magnet 3 is provided on one end 5' of said synthetic resin holder 5, one end of said electrical connective terminal 4a, 4b and 4c is projected from one end at a side where said magnet 3 is installed to said synthetic resin holder 5 and is connected electrically to a circuit board 6 on which said magneto-electric converter element 2 is mounted and is installed one end part of said synthetic resin holder 5, and at least three terminals of said electrical connective terminals 4a, 4b and 4c are arranged by standing in one row, one end at a side where these electrical connective terminals 4a, 4b and 4c are connected to said circuit board 6 is soldered by passing through each of holes 16a, 16b and 16c (see FIG. 2 and FIG. 6) for catching terminal which is provided on said circuit board 6, and among these electrical connective terminals 4a, 4b and 4c to two both sides 4a and 4c a board receiving part 41 (see FIG. 5) is provided by contacting one part those of to a rear face of said circuit board 6.

Further, the operations according to the present invention will be explained in a latter description of the invention item.

DESCRIPTION OF THE INVENTION

A revolution sensor of the embodiments according to the present invention will be explained referring to drawings.

Figure 1A:
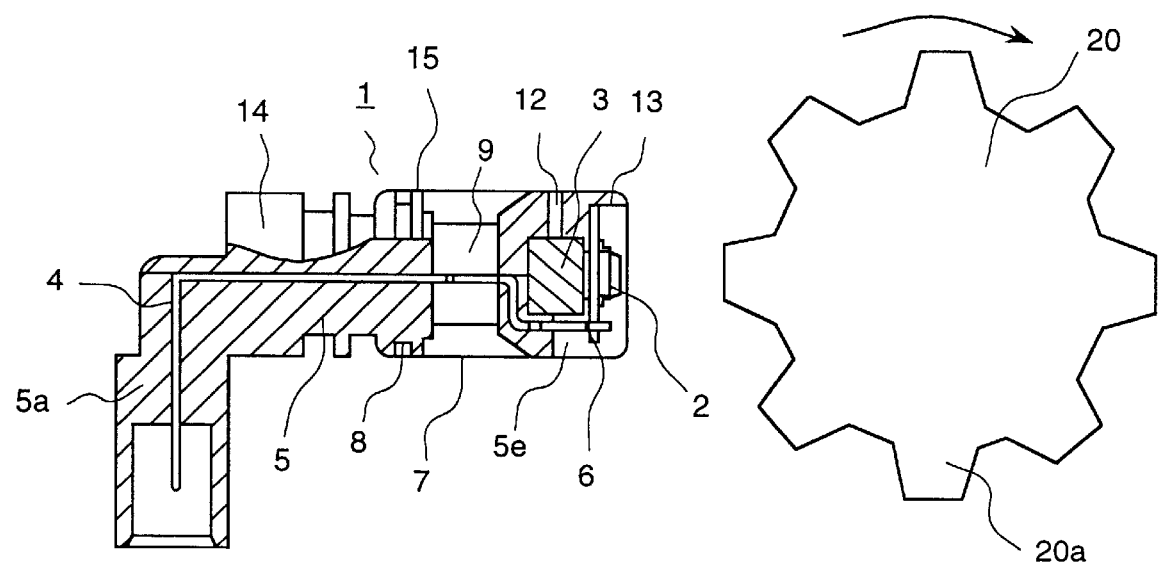
FIG. 1A is a partially cross-sectional constructive view showing a revolution sensor 1 of one embodiment according to the present invention in which a rotor of magnetic material 20 being a rotary body to be subjected to detection is shown.
Figure 1B:
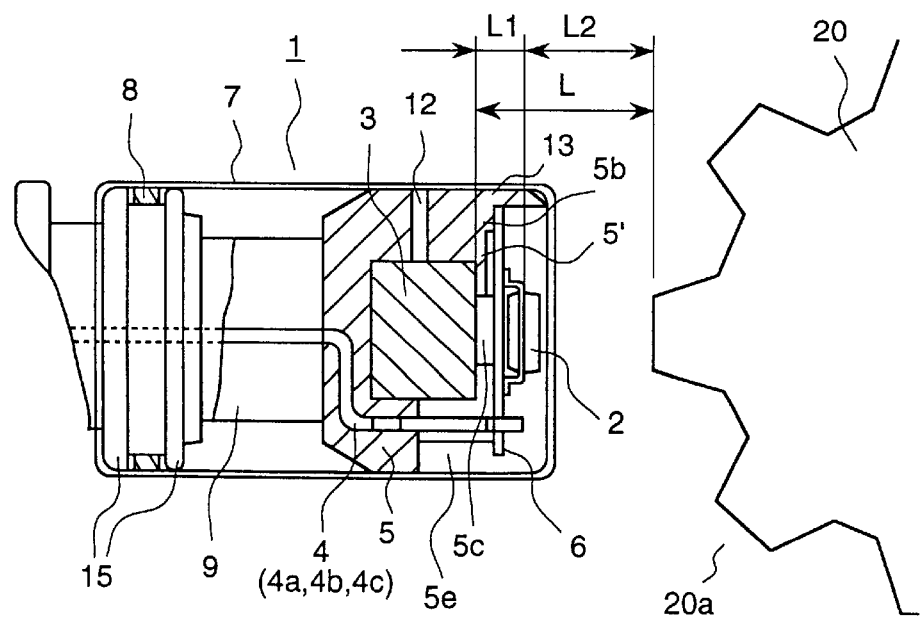
FIG. 1B is a partially enlarged cross-sectional view showing the revolution sensor 1 shown in FIG. 1A.

FIG. 1A is a partially cross-sectional constructive view showing a revolution sensor 1 of one embodiment according to the present invention in which a rotor 20 of magnetic material being a rotary body to be subjected to detection is shown, and FIG. 1B is a partially enlarged cross-sectional view showing the revolution sensor 1.

Figure 2A:
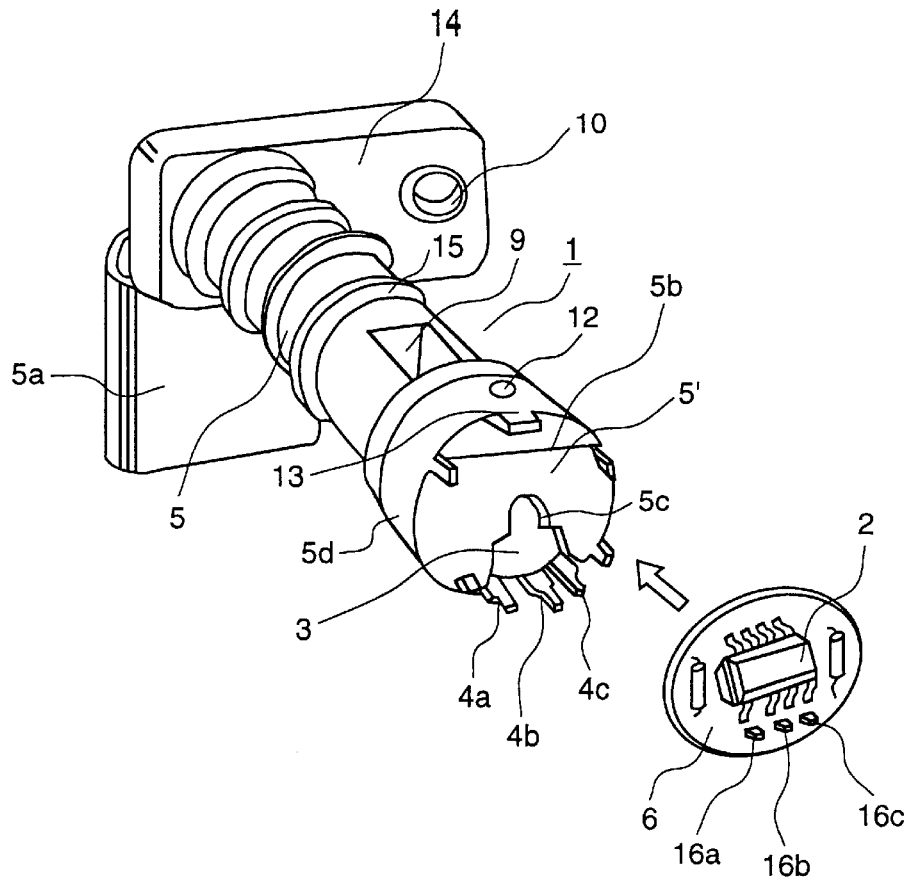
FIG. 2A is a squint view showing a condition immediately before an assembly of a circuit board 6 on which a magneto-electric converter element is mounted to the above stated revolution sensor 1.
Figure 2B:
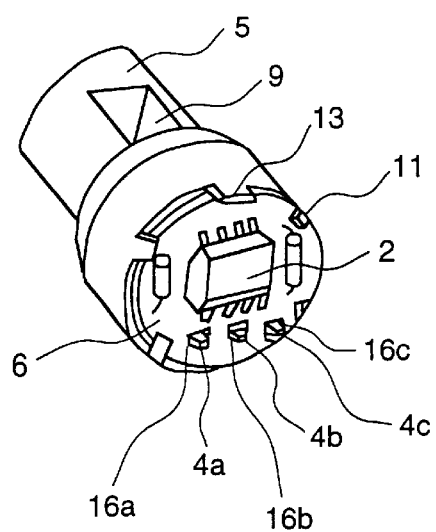
FIG. 2B is a partially squint view of the revolution sensor 1 after the assembly of the circuit board 6.
Figure 3:
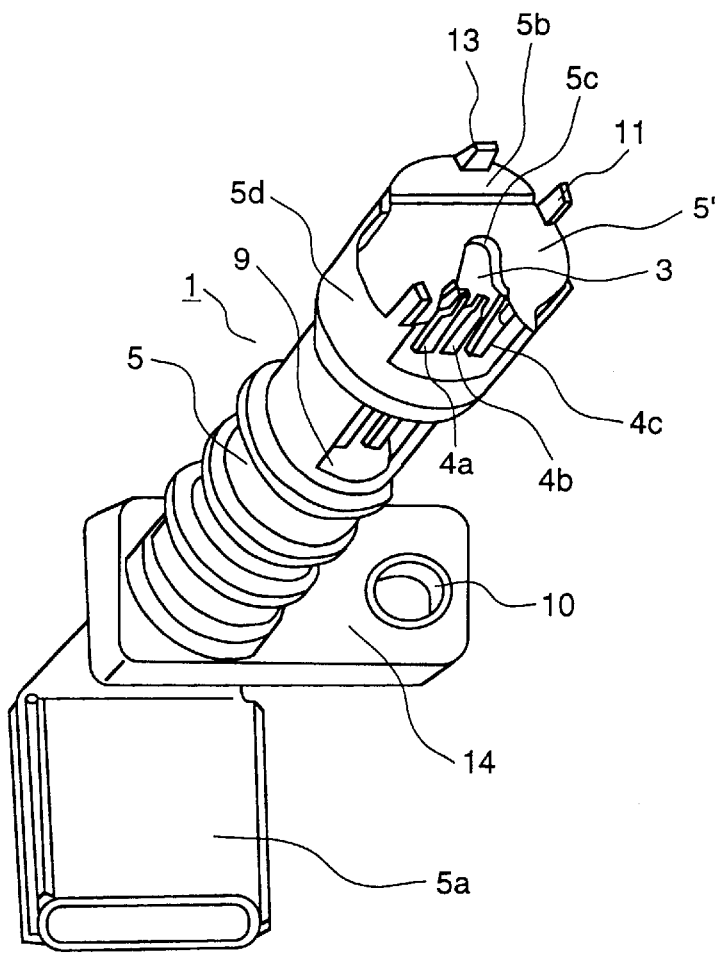
FIG. 3 is a squint view showing the revolution sensor 1 shown in FIG. 2A taken from a lower side.

FIG. 2A is a squint view showing a condition immediately before assembly of a circuit board 6 on which a magneto-electric converter element is mounted to the above stated revolution sensor 1, FIG. 2B is a partial squint view of the revolution sensor 1 after the assembly of the circuit board 6, and FIG. 3 is a squint view showing the revolution sensor 1 shown in FIG. 2B taken from a lower side before the installation of the circuit board 6.

In these figures, the revolution sensor 1 is constituted by a magneto-electric converter element 2, for example, constituted by a Hall element, a magnet 3 being a permanent magnet for giving the magnetic field to the magneto-electric converter element 2, an electrical connective terminal 4 being a connector pin for an outside connection use, a synthetic resin holder 5 being a connector 5a as one body type and in which the magnet 4 and the electrical connective terminal 4 are insert molded, and a protection cap 7 etc. The magneto-electric converter element 2 can be formed by a magnetic resistance element (MR element).

The electrical connective terminal 4, as shown in FIG. 2, is constituted by three terminals 4a, 4b and 4c, each of one end of the three terminals 4a, 4b and 4 is connected electrically to the circuit board 6 on which the magneto-electric converter element 2 is mounted through a soldering method etc., and with this connection structure the circuit board 6 for mounting the magneto-electric converter element 2 is held to the synthetic resin holder 5.

The electrical connective terminals 4a, 4b and 4c for an input use and an output use to the magneto-electric converter element 2 and the magnet 3 are insert molded to the synthetic resin holder 5, for example such as an epoxy resin holder 5 etc. Herein, the insert molding is that in which electrical connective terminals 4a, 4b and 4c and the magnet 3 are set in a metal mold for the synthetic resin holder 5 molding use in advance and these set components are buried by a resin molding method.

Since the magnet 3 is insert molded to the synthetic resin holder 5, by one end 5' of the synthetic resin holder 5 at least one part of an one end face at a side for opposing to a rotor 20 of magnetic material of the magnet 3 is covered.

In this embodiment, to one part of the covering part 5' a step face 5b is formed, at an outer face of this step face 5b the circuit board 6 on which the magneto-electric converter element 6 is mounted is put over and this circuit board 6 is connected to the electrical connective terminals 4a, 4b and 4c and then the magneto-electric converter element 2 is installed on the one end face 5' of the synthetic resin holder 5.

The circuit board 6 constitutes a circuit in which by mounting the magneto-electric converter element 2, a diode, a resistor, a condenser etc. on a print board, an input and an output processing of an electrical signal for converting the magneto-electric conversion.

As shown in FIG. 2A, at an outer peripheral edge of the tip end face 5' of the synthetic resin holder 5 plural projection members 11, for example four number, for a position determination use are provided. And after the circuit board 6 is fitted into an area of an inner side of the projection members 11, as shown in FIG. 2B, the projection members 11 are crushed through the heat and then the circuit board 6 is fixed securely to the one end face 5' of the synthetic resin holder 5.

The electrical connective terminals 4a, 4b and 4c are arranged by standing in one row or forming in a line, and corresponding to this arrangement, three holes 16a, 16b and 16c for catching terminals are arranged by forming in one row on the circuit board 6. The respective one end of the electrical connective terminals 4a, 4b and 4c is passed through and soldered to the respective three hole 16a, 16b and 16c for catching terminals, respectively. With this construction, the one ends of the electrical connective terminals 4a, 4b and 4c are projected from an end face at an installation side of the magnet 3 of the synthetic resin holder 5 and are connected electrically to the circuit board 5 on which the magneto-electric converter element 2 is mounted.

Figure 5A:
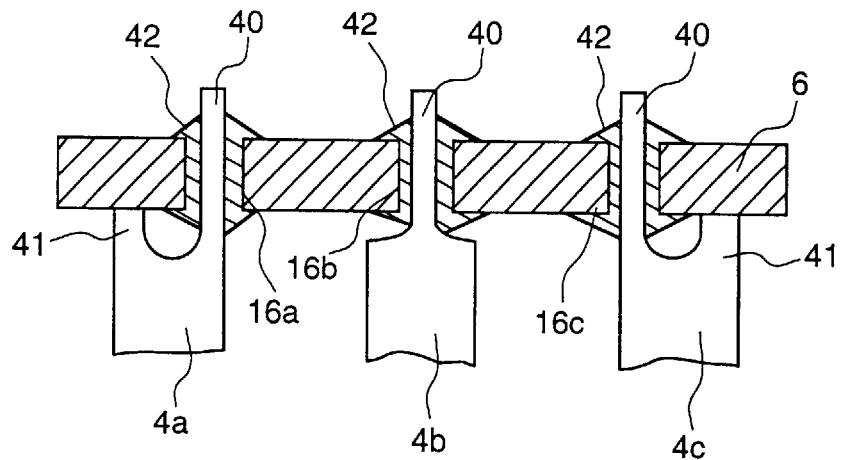
FIG. 5A is a cross-sectional view showing emphasized connective parts between the circuit board 6 and the electrical connective terminals-4a–4c in the above stated embodiment.

FIG. 5 is a cross-sectional view showing the connective parts between the circuit board 6 and the electrical connective terminals 4a, 4b and 4c using an emphasis expression. To the electrical connective terminals 4a, 4b and 4c, portions for inserting to the holes 16a, 16b and 16c for catching terminals are formed, further a board receiving portion 41 is provided. A part of this board receiving portion 41 contacts to a rear face of the circuit board 6 to both two sides (the electrical connective terminals 4a and 4c) among these three electrical connective terminals 4a, 4b and 4c and receives the circuit board 6.

To the middle electrical connective terminal 4b, the board receiving portion 41 is not provided. The reasons why the board receiving portion 41 is provided limitedly to both two sides electrical connective terminals 4a and 4c among the three electrical connective terminals 4a, 4b and 4c are as following.

Figure 6A:
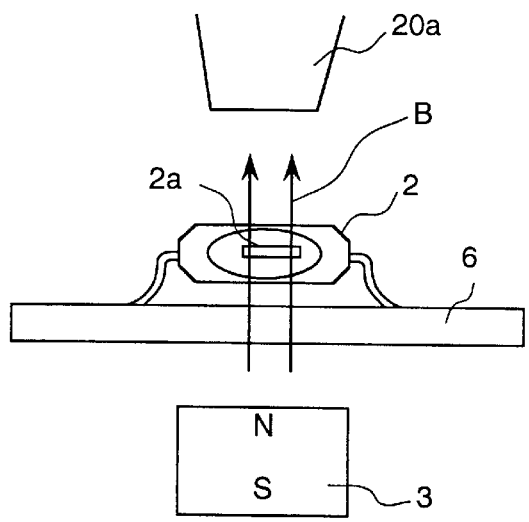
FIG. 6A is a view showing a position relationship among one end face of the magnet 3, a projection member 20a of the rotor 20 of magnetic material and a magnetic sensing part 2a of a Hall IC 2 in the above stated embodiment.

Namely, against the orthogonal magnetic flux the magneto-electric converter element 2 (the Hall IC) is outputted by magnetic sensitizing exceedingly, as shown in FIG. 6A, when one end face of the magnet 3 and the projection member 20a of the rotor 20 of magnetic material are arranged oppositely in a parallel condition, the magnetic sensing part 2a of the Hall IC 2 maintains to the utmost the parallel degree against the above stated projection member 20a and the one end face of the magnet 3 and then the orthogonality against the flux density can be heightened.

Figure 5B:
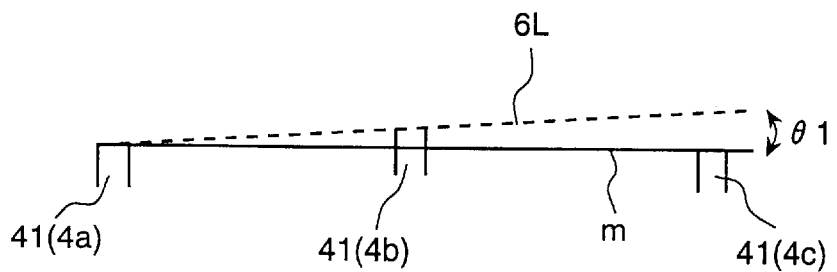
FIGS. 5B and 5C are schematic views showing the circuit board of FIG. 5A at two different inclinations θ1 and θ2 respectively.

Namely, in a case where supposing that to all the electrical connective terminals 4a, 4b and 4c the circuit board 41 is provided, as shown in FIG. 5B, when a projection degree of the board receiving portion 41 of the middle electrical connective terminal 4b is larger than the board receiving portions 41 of the other electrical connective terminals 4a and 4c according to the scatters in the size accuracy, the circuit board 6 is supported by two points which are the electrical connective terminal 4a (or 4c) and the electrical connective terminal 4b and an inclination angle becomes θ1. A broken line 6L shows an inclination of the circuit board 6 and a real line m shows a standard horizontal line.

Figure 5C:
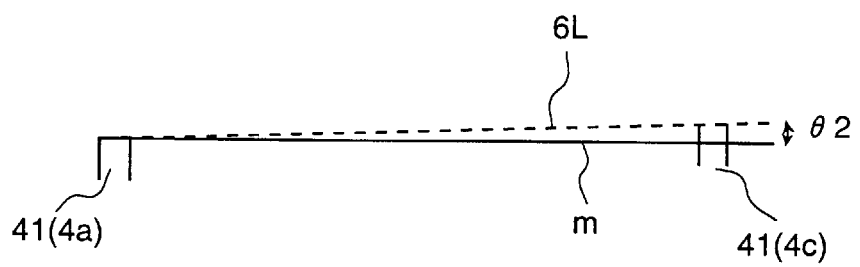

On the other hand, as shown in this embodiment, in a case where the board receiving portion 41 is formed limitedly to the both sides electrical connective terminals 4a and 4c, the projection degree of the board receiving portion 41 of the one side electrical connective terminal (for example, the electrical connective terminal 4c) is larger than the another side electrical connective terminal 4a according to the scatter degree of the size accuracy (this projection degree is the same amount value in the case of the electrical connective terminal 4b), the circuit board 6 is supported by the two points of the electrical connective terminals 4a and 4c as shown in FIG. 5C and the inclination degree becomes θ2.

When the inclination angles θ1 and θ2 are compared, the relationship has θ1>θ2. As a result, according to the revolution sensor 1 of this embodiment according to the present invention, when the one end face of the magnet 3 and the projection member 20a of the rotor 20 of magnetic material are arranged oppositely in the parallel condition, the magnetic sensing part 2a of the Hall IC 2 is held to the utmost the parallel degree against the above stated projection member 20a and of the one end face of the magnet 3 and then the orthogonality against the magnetic flux density can be heightened.

Figure 6B:
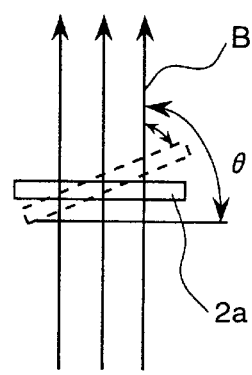
FIG. 6B is a view showing a relationship between the magnetic sensing part 2a and the magnetic flux B for passing through the magnetic sensing part 2a shown in FIG. 6A.

FIG. 6B shows a relationship between the magnetic flux B and the inclination θ of the magnetic sensing part 2a of the magneto-electric converter element 2 (the Hall IC) against the magnetic flux B. An output V of the magneto-electric converter element 2 is expressed by $$V = kB \times \sin \theta$$

θ=90 degree, namely the magneto-electric converter element 2 obtains the most largest output against the orthogonal magnetic flux density. Herein, k is a coefficient.

As a result, according to the revolution sensor 1 of this embodiment according to the present invention, since the board receiving portion 41 of the electrical connective terminals 4a and 4c is taken the above stated consideration, the output lowering of the magneto-electric converter element 2 can be prevented to the utmost.

Since the magnet end face covering part 5' of the synthetic resin holder 5 is intervened between the magnet 3 and the magneto-electric converter element 2, a predetermine gap is secured between the magnet 3 and the magneto-electric converter element 2. A distance L1 (an air gap) between the magnetic sensing part 2a (see, FIG. 6A) of the magneto-electric converter element 2 and a tip end face of the magnet 3 is maintained at least 1.5 mm by intervening the thickness of the covering part 5' and the thickness of the circuit board 6. The reasons for setting this gap (the distance) L1 will be explained hereinafter.

The magneto-electric converter element 2 is positioned between the magnet 3 and the rotor 20 of magnetic material. The rotor 20 of magnetic material is constituted with a gear shape in which the projection member 20a is formed with rightly regulated arrangement. And by rotating the rotor 20 of magnetic material, since the projection member 20a is repeated with an opposing state (face to face with a tooth position) and a non-opposing state (face to face with a slot position) to the tip end portion of the revolution sensor 1, the magnetic field of the magneto-electric converter element 2 which is formed by the magnet 5 changes.

Namely, according to the opposing state (face to face with the tooth position) and the non-opposing state (face to face with the slot position) of the projection member 20a, the strength of the magnetic field (the increase of the magnetic flux) which is applied to the magneto-electric converter element 2 by the magnet 5 is repeated, the magneto-electric converter element 2 output this quantitative change in the magnetic flux and this quantitative change in the magnetic field as the electrical signal, and from this electrical signal, the revolution speed (the revolution number), for example, can be requested.

Figure 7:
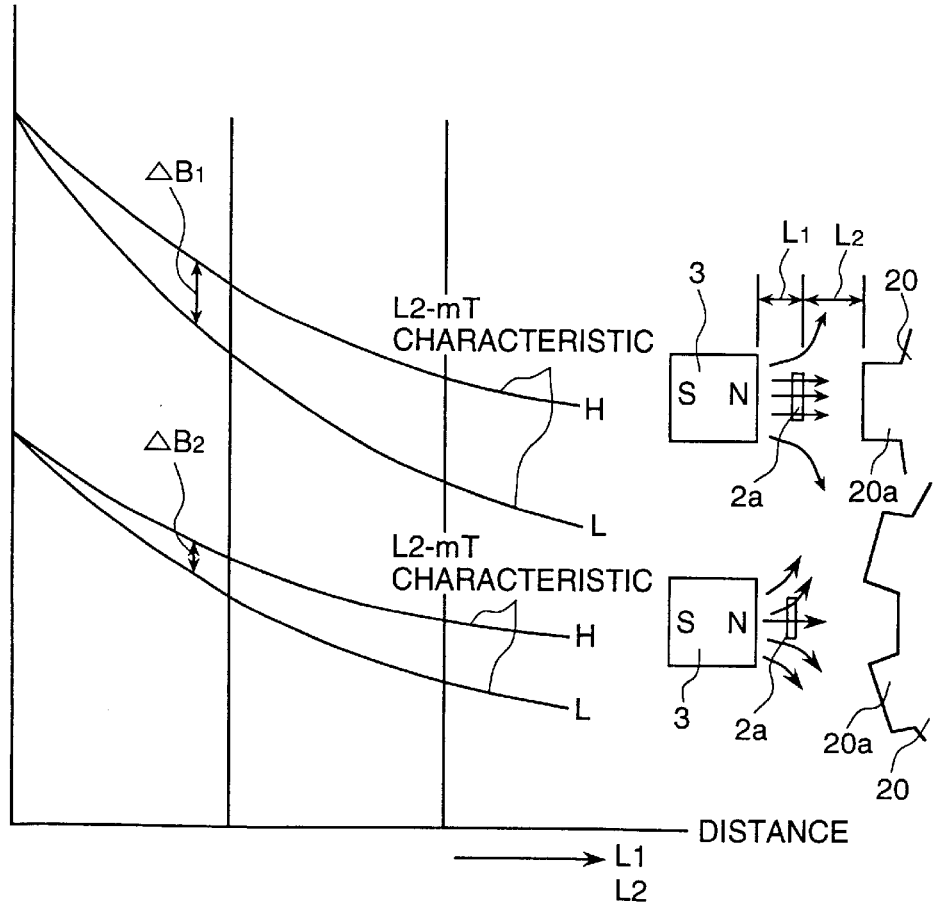
FIG. 7 is a graph showing a relationship between the quantitative change widths ΔB1 and ΔB2 of the magnetic density passing through the magnetic sensing part 2a against the distance L1 between the magnet 3 and the magnetic sensing part 2a of the magneto-electric converter element 2 and the distance L2 between the magnetic sensing part 2a and the rotor 20 of magnetic/material.

FIG. 7 shows a relationship of variation widths Δ B1 and ΔB2 of the magnetic flux density (mT) which passes through the magnetic sensing part 2a against the distance L1 formed between the magnetic sensing part 2a of the magneto-electric converter element 2 and against the distance L2 formed between the magnetic sensing part 2a of the magneto-electric converter element 2 and the rotor 20 of magnetic material.

H in the magnetic flux density characteristic lines (the L1.mT characteristic and the L2.mT characteristic) is the magnetic flux density characteristic where the projection member 20a of the rotor 20 of magnetic material is formed at a rightly opposing position with the magnet 3, and L is the magnetic flux density characteristic where a recess portion formed between the rotor 20 of magnetic material and the projection member 20a is formed at a right opposing position with the magnet 3 (the projection member 20a is the non-opposite state against the magnet 3).

The more the magnetic flux density characteristics L1 and L2 are small (the more the air gap is small), the more the magnetic flux density which passes through the magnetic sensing part 20a becomes large, but the magnetic flux density characteristics L1 and L2 are small, the change width of the magnetic density, namely the magnetic flux quantitative change amounts ΔB1 and ΔB2, can not assured fully. Further, the magnetic flux density characteristics L1 and L2 become large, the magnetic flux quantitative change amounts ΔB1 and ΔB2 become large, however the absolute amount of the magnetic flux lowers and as a result the satisfied output can not be assured.

Figure 8:
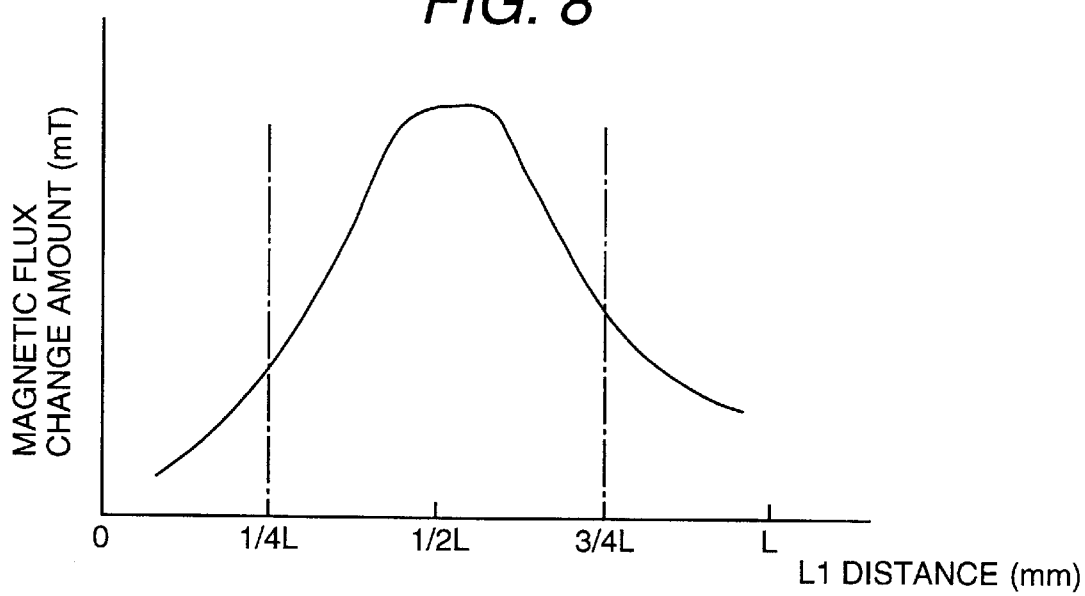
FIG. 8 is a graph showing the quantitative change amount of the magnetic flux passing through the magnetic sensing part 2a (applied to the magnetic sensing part 2a) by varying variously the distance L1 by adding an absolute amount of the magnetic flux from the above stated relationship of FIG. 7.

FIG. 8 shows a graph in which by adding the absolute amount of the magnetic flux form the relationship shown in the above stated FIG. 7 and by changing the magnetic flux density characteristic L1, the quantitative change amount of the magnetic flux which passes through the magnetic sensing part 2a (which is applied to the magnetic sensing part 2a). When the distance L1 to the magnetic sensing part 2a of the magneto-electric converter element 2 is ½ of the distance L which is the distance from the surface of the magnet 3 to the projection member 20a, the magnetic flux quantitative change amount is the largest some more, and the revolution detection in the revolution sensor 1 can be carried out effectively.

According to the experiments by the inventors of this present invention, under the conditions where the magnetic force of the magnetic sensing part 2a is 100–3000 gausses and the sensibility degree of the Hall IC 2 is 100 gausses, the distance L1=¼L–¾L, and also the distance L1 is within a range of 1.5 mm–4.5 mm, then the output based the quantitative change amount ΔB1 can be obtained, and in the present invention it can set freely with the above stated setting values.

Further, to assure the freedom degree of the arrangement position of the magneto-electric converter element 2, a thickness A of the board of the circuit board 6 is formed less than 0.8 mm.

As to the magnet 3 is insert molded to the synthetic resin holder 5, in this embodiment, a column shape permanent magnet is used, however from the aspects for the assurance of the orthogonal magnetic flux against the magnetic sensing part 2a of the magneto-electric converter element 2 and for the thickness accuracy of the covering part 5' and for the position relationship of the magnet 3 against the rotor 20 of magnetic material, etc., as to the position accuracy of the magnet 3 the high position accuracy is required.

In the revolution sensor 1 of this embodiment according to the present invention, to respond to the above stated requirements, the end face at a side where the magnet 3 is covered by the covering part 5' of the synthetic resin holder 5 which exists an exposure part where a part is not covered by the covering part 5'. Further, a part of an outer peripheral face of the magnet 3 which intersects with this exposure part is exposed.

At these exposure positions, the high accuracy positioning of the magnet 3 during the molding of the synthetic resin holder 5 (during the insert molding of the magnet 3) can be carried out. In advance of the positioning where the exposure part of the magnet 3 is utilized, the carrying-out embodiments of the magnet exposure part will be explained referring to from FIG. 4A to FIG. 4E.

Figure 4A:
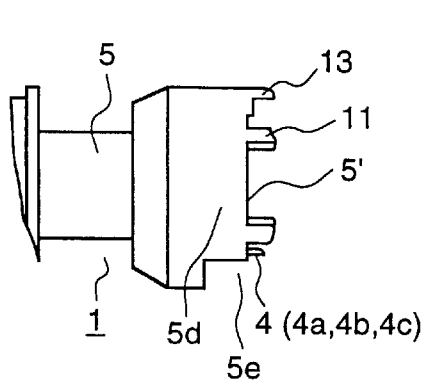
FIG. 4A is a partial front view showing a synthetic resin holder 5 before an assembly of the circuit board 6 and a protection cap 3 in the above stated embodiment.
Figure 4B:
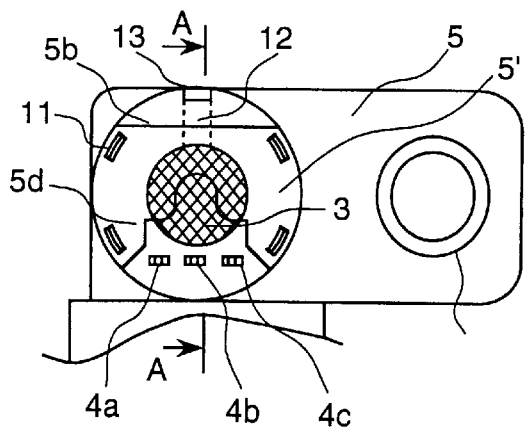
FIG. 4B is a partial side view showing the synthetic resin holder 5 taken from a right side (a magnet installation side)
Figure 4C:
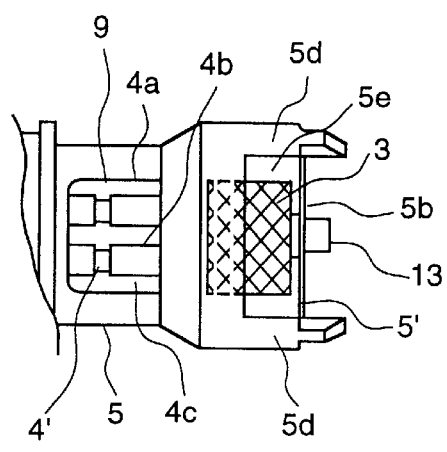
FIG. 4C is a partial side view showing the synthetic resin holder 5 taken from a lower face.
Figure 4D:
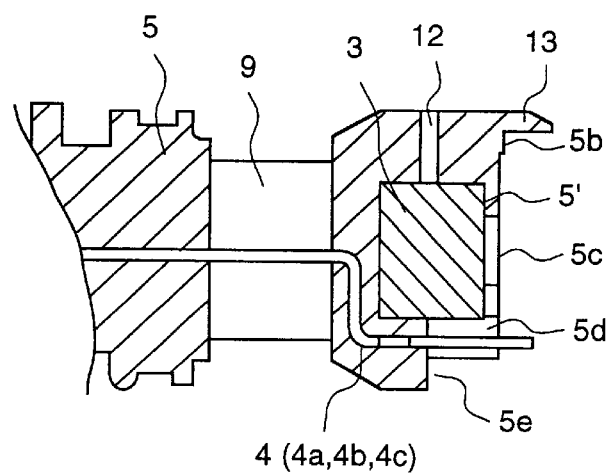
FIG. 4D is a cross-sectional view showing the synthetic resin holder 5 taken from a line A—A of FIG. 4B.
Figure 4E:
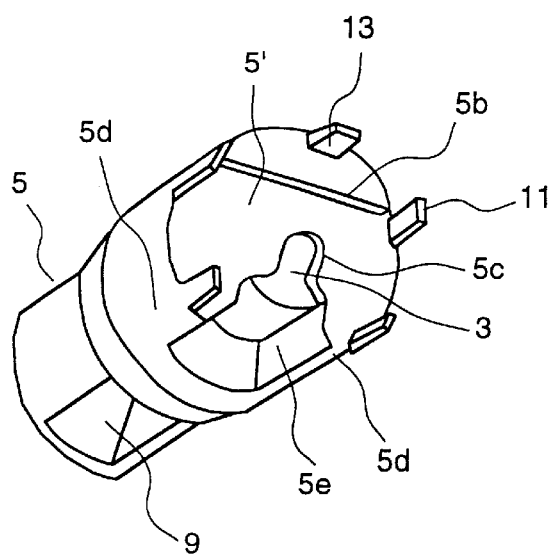
FIG. 4E is a partially cross-sectional view showing the synthetic resin holder 5 taken of the lower face in which for the convenience electrical connective terminals 4a–4c are excepted.

FIG. 4A is a partial front view showing the synthetic resin holder 5 before the assembly of the circuit board 6 and the protection cap 3 in the above stated embodiment, FIG. 4B is a partial side view showing the synthetic resin holder 5 taken from a right side (a magnet installation side), FIG. 4C is a partial side view showing the synthetic resin holder 5 taken from a lower face, FIG. 4D is a cross-sectional view showing the synthetic resin holder 5 taken from a line A—A of FIG. 4B, and FIG. 4E is a partially cross-sectional view showing the synthetic resin holder 5 taken of the lower face in which for the convenience electrical connective terminals 4a, 4b and 4c are excepted.

In FIG. 4B and FIG. 4C, the portion in which the magnet 3 is covered by the synthetic resin holder 5 is shown using a break intersection line and the outside exposure part is shown using a real intersection line. As shown in from FIG. 4A to FIG. 4E, at the end portion of a side of the arrangement of the magnet 3 of the synthetic resin holder 5, the covering part 5', as shown in a reference numeral 5c, a part of the magnet 5 forms a portion where the end face of the magnet 3 is exposed.

Further, at a lower portion of a tip end of the synthetic resin holder 5, a space 5e for exposing the part of a lower portion outer peripheral face of the magnet 3 is formed. The exposure part of the end face of the magnet 3 and the exposure part of the outer peripheral face of the magnet 3 are continued with the orthogonal condition. The exposure space 5e of the magnet 3 is formed with a skirt spread out shape toward the lower portion by one part 5d of the synthetic resin holder 5.

Figure 12:
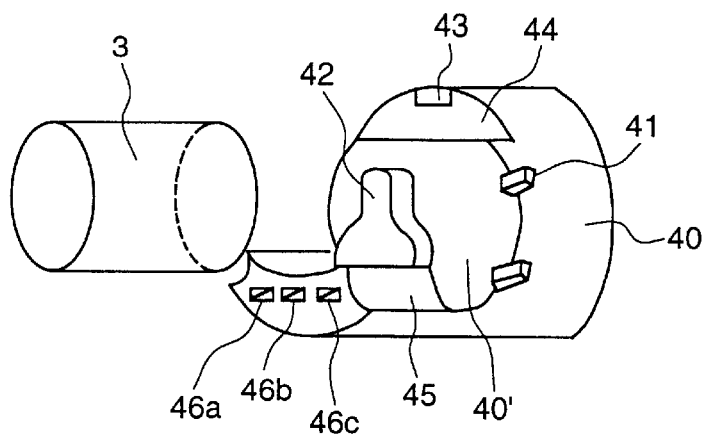
FIG. 12 is a schematic view showing one case in which the synthetic resin holder 5 is molded in the above states embodiments.

FIG. 12 is a schematic view showing a case where the synthetic resin holder 5 is molded. A metal mold 40 comprises a magnet receiving portion 45 for receiving a part of the magnet 3 which is insert molded, a groove part 41 for forming the position determination projection member 11, a groove part 43 for forming a cap position determination projection member 13, terminal receiving groove parts 46a, 46b, and 46c for assuring the projection portions of the electrical connective terminals 4a, 4b and 4c which are insert molded, and a projection member 42 for assuring the exposure part of the end face of the magnet 3.

In a case where the synthetic resin holder 5 is molded, by applying one end face of the magnet 3 to the projection member 42, the positioning of an axial direction of the magnet 3 is determined, and the part of the magnet 3 is mounted on the magnet receiving portion 45 and then the positioning at a radial direction of the magnet 3 is determined.

Figure 13:
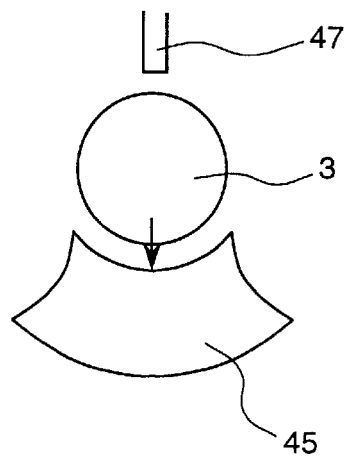
FIG. 13 is a schematic view showing another case in which the synthetic resin holder 5 is molded in the above stated embodiments.

In the case of the molding, as shown in FIG. 13, after a lower side of an outer peripheral face of the part of the magnet 3 has mounted on the magnet receiving portion 45, by pressing an upper side of the outer peripheral face of the magnet 3 by a mold pin 47, the magnet 3 is set fixedly to the metal mold 40. As a result, when the resin is flown to the metal mold 40, an occurrence about the position shift of the magnet 3 can be prevented. A reference numeral 12 shown in FIG. 1, FIG. 2 and FIG. 4B etc., is a hole where a mold pin 4 has pulled out.

According to the revolution sensor 1 of this embodiment of the present invention, when the end face of the magnet 3 is covered by the covering part 5', since the exposure part of the magnet 3 can make the positioning at the axial direction and the radial direction of the magnet 3 during the molding, it is possible to attain the high position accuracy of the insert molded magnet 3, and this obtained high position accuracy in the revolution sensor 1 can be contributed to the high efficiency revolution detection.

The electrical connective terminals 4a, 4b and 4c are set by joining together as one body as shown in a reference numeral 4' of FIG. 4C to hold the mutual position accuracy during the insert molding. Namely, the electrical connective terminals 4a, 4b and 4c are cut out and molded at a condition in which one metal sheet is joined together and under this joining condition the electrical connective terminals 4a, 4b and 4c are set in the metal mold 40 for molding the synthetic resin holder 5. After the synthetic resin holder 5 has molded, since the above stated joining portion 4' is set to position to a penetration window 9 which is provided on the synthetic resin holder 5, at a position of this penetration window 9 by cutting out the joining portion 4', each of the electrical connective terminals 4a, 4b and 4c is formed independently.

To the molded synthetic resin holder 5, as shown in FIG. 2, after the circuit board 6 on which the magneto-electric converter element 2 is mounted has fixed, in the synthetic resin holder 5, the parts of the magneto-electric converter element 2, the magnet 3, the penetration window 9 are covered by the metal protection cap 7, and the revolution detection structure for protecting the outside stress of the revolution sensor 1 can be obtained.

Further, an O-ring 8 is inserted and mounted between the flanges of the outer peripheral face of the synthetic resin holder 5 and an end tip of the metal protection cap 7 is carried out by the caulking, as a result the air tight performance can be assured. The projection member 13 which is provided on a tip end of the synthetic resin holder 5 functions as a stopper member not for applying the protection cap 7 to the magneto-electric converter element 2 and then using this structure the position of the magneto-electric converter element 2 cannot be go wide of the wide.

In the synthetic resin holder 5, at an opposite side of a side where the magnet 3 is provided, a connector 5a is provided integrally to the synthetic resin holder 5, one end of an opposite side of a side where the electrical connective terminals 4a, 4b and 4c are connected to the circuit board 6 of the magneto-electric converter element 2 is projected to the connector portion 5a and then a connector pin terminal is constituted.

To the connector portion 5a a connector for communicating with a lead wire for joining together to an engine control unit (not shown in drawing) is inserted and connected. Further, the revolution sensor 1 is installed and fixed to the engine portion by a collar which is buried in a flange portion 14 of the synthetic resin holder 5.

According to the revolution sensor 1 of this embodiment of the present invention, following effects can be obtained.

(1) The distance L1 from magnet 3 to the magnetic sensing part 2a of the magneto-electric converter element 2 is L1=¼L–¾L, wherein the distance L is from the surface of the magnet 3 to the projection member 20a of the rotor 20 of magnetic material, and the distance L1 is set within a range of 1.5 mm–4.5 mm, accordingly the magnetic flux quantitative change amount of the magnetic sensing part 2a of the magneto-electric element 2 according to the opposition and the non-opposition the projection member 20a of the rotor 20 of magnetic material against the magnet 3 is made large and the detection sensitivity of the revolution sensor 1 can be heightened according to the output having the good efficiency.

(2) The gap (the distance) relating to the above stated distance L1 can be assured easily by utilizing the thickness between the one part 5' (the covering part) of the synthetic resin holder 5 and the circuit board 6 and further to assure it is not unnecessary to employ the gap any specific component, as a result the simplification performance of the constituting components of the revolution sensor 1 can be improved.

(3) When the one end face of the magnet 3 and the projection member 20a of the rotor 20 of magnetic material are opposed against the parallel condition, the magnetic sensing part 2a of the magneto-electric element 2 is maintained at the utmost the parallel degree against the projection member 20a and the one face of the magnet 3 and is heightened the orthogonality, and as a result the improvement in the output of the magneto-electric converter element 2 can be obtained.

(4) When the magnet 3 is insert molding formation to the synthetic resin holder 5, even the above stated go covering part 5' is assured, at the end face of the magnet 3 the portion which is not covered by the covering part 5' is left, and further at the one part of the outer periphery of the magnet 3 which is orthogonal to the exposure part of the end face of the magnet 3, since the exposure part is assured, it is possible to carry out the position determination for the high accuracy of the magnet 3.

Figure 9:
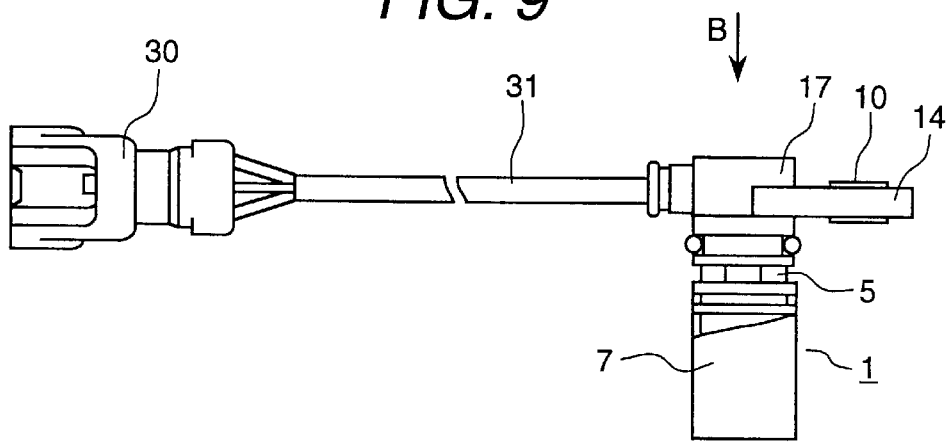
FIG. 9 is a front view showing the revolution sensor of a second embodiment according to the present invention.
Figure 10:
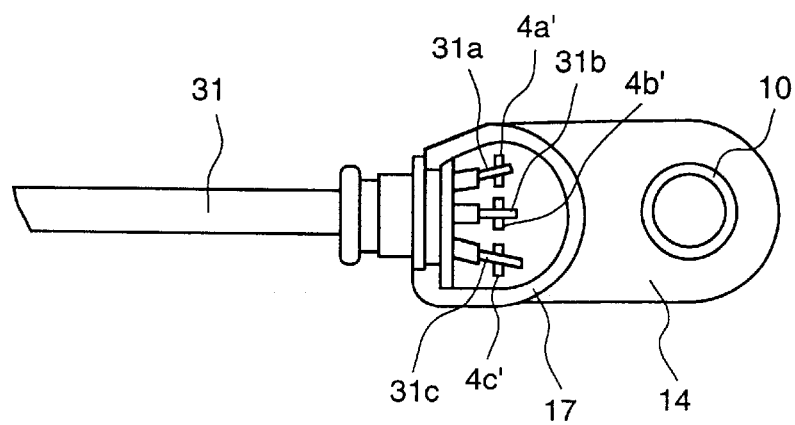
FIG. 10 is a view of the revolution sensor shown in FIG. 9 taken from B direction arrow mark.

FIG. 9 is a front view showing the revolution sensor according to another embodiment according to the present invention and FIG. 10 shows a view taking along B—B direction of an arrow mark of FIG. 9. In these figures, the reference numerals similar to the those of from FIG. 1 to FIG. 6 show the same elements.

The basically construction of the revolution sensor 1 of this embodiment according to the present invention is similar to that of the revolution sensor 1 of the first embodiment according to the present invention and the different portion is a connector embodiment of the electrical signal of the revolution sensor 1.

In the revolution sensor 1 of this embodiment according to the present invention, in place of the connector 5 shown in the first embodiment, to an one end of the synthetic resin holder 5 a lead wire introduction part 17 for introducing the respective lead wires 31a, 31b and 31c of an electrical code 31 is formed integrally with the synthetic resin holder 5.

Among the electrical connective terminals 4a, 4b and 4c the one ends 4a', 4b' and 4c' of the electrical connective terminals 4a, 4b and 4c, which are positioned at an opposite side to a side in which the magneto-electric converter element 2 is connected to the circuit board 6, are projected into the interior portion of the lead wire introduction part 17 and at the lead wire introduction part 17 the code 32 (the lead wires 31a, 31b and 31c) having the connector is connected electrically by the soldering manner, etc.

Figure 11:
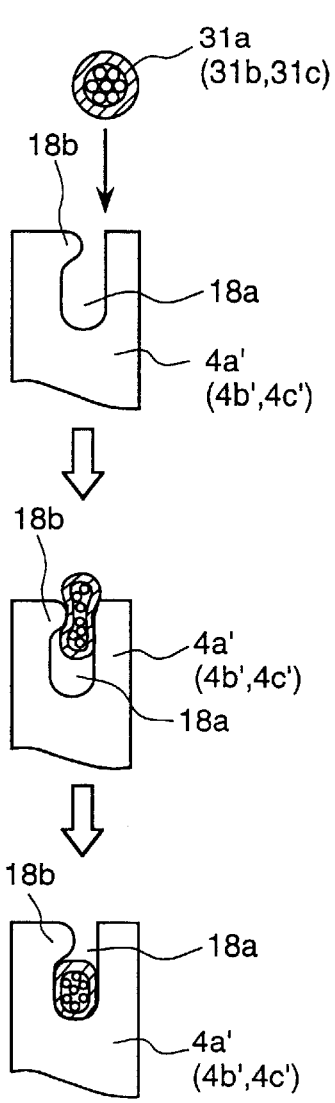
FIG. 11 is an explanatory view showing a condition for sandwiching a lead wire to one ends 4a'–4c' of the electrical connective terminals 4a–4c used in the second embodiment.

FIG. 11 shows the shapes of the one ends end 4a', 4b' and 4c of the electrical connective terminals 4a, 4b and 4c which are used in the second embodiment according to the present invention. Since the one ends end 4a', 4b' and 4c' of the electrical connective terminals 4a, 4b and 4c have respectively the same shape, one among them is indicated as a representative example. The one ends end 4a', 4b' and 4c' of the electrical connective terminals 4a, 4b and 4c are formed with a bifurcation shape in which the lead wires 31a, 31b and 31c are inserted respectively and assures a space 18a. Further, an inlet of the sandwiched space 18a is squeezed to form narrow by a projection member 18b which is provided on one of the bifurcation member.

According to the revolution sensor 1 of the first embodiment of the present invention, since the optimum condition of the distance L1 to the magnetic sensing part 2a of the magneto-electric converter element 2 is realized, the magnetic flux quantitative change amount of the magnetic sensing part 2a of the magneto-electric converter element 2 according to the repetition of the opposing state (face to face with the tooth position) and the non-opposing state (face to face with the slot position) to the magnet 3 by the revolution position index (for example, the projection member 20a) of the rotor 20 of magnetic material can be made large, as a result the detection sensitivity degree of the revolution sensor 1 can be heightened according to the high efficiency output.

According to the revolution sensor 1 of the second embodiment of the present invention, since the gap (the distance) relating to the above stated distance L1 can be assured easily by the thickness between one part 5' (the covering part) of the synthetic resin holder 5 and the circuit board 6, and also since any specific component is unnecessary to assure the gap, the simplification performance of the constituting components for the revolution sensor 1 can be attained.

Further, in the case of the insert molding of the magnet 3 to the synthetic resin holder 5, when the above stated covering part 5' is assured, the portion which is not covered by the covering part 5' is left on the end face of the magnet 3 and further the exposure part is assured at the one portion of the outer periphery of the magnet 3 which is orthogonal to the end face exposure part of the magnet 3, as a result it is possible to determine the positioning having the high accuracy.

According to the revolution sensor 1 of the third embodiment of the present invention, when the one end face of the magnet 3 and the projection member 20a of the rotor 20 of magnetic material are opposed in the parallel condition, the magnetic sensing part 2a of the magneto-electric converter element 2 is held to the utmost the parallel degree against the above stated projection member 20a and the one end face of the magnet 3 and the orthogonality against the magnetic flux density can be heightened, as a result the output improvement of the magneto-electric converter element 2 can be attained.

What is claimed is:

1. In a revolution sensor having a magneto-electric converter element and a magnet magnetic establishing field for raid magneto-electric converter element, said magneto-electric converter element being positioned between said magneto-electric converter element being positioned between said magnet and a rotor of magnetic material, wherein a change in the magnetic field caused by revolution of said rotor of magnetic material is outputted by said magneto-electric converter element as an electrical signal, and a distance L is formed between said magnet and said rotor of magnetic material, and a distance L1 is formed between said magnet and a magnetic sensing part of said magneto-electric converter element-such that L1 is in a range from ¼L to ¾L, and said distance L1 is in a range from about 1.5 mm to 4.5 mm.

2. In a revolution sensor having a magneto-electric converter element and a magnet for establishing a magnetic field for said magneto-electric converter element, a change in the magnetic field being caused by revolution of a rotor of magnetic material being outputted by said magneto-electric converter element as an electrical signal, electrical connective terminals for an input use and an output use of said magneto-electric conversion element and said magnet are insert molded to a synthetic resin holder; and at least one part of one end face at a side which is arranged oppositely to said magnet with said rotor of magnetic material is covered by one end of said synthetic resin holder, at an outer face of a covering part a circuit board on which said magneto-electric converter element is mounted is installed, and further said covering part is between said magnet and said magneto-electric converter element, whereby a predetermined gap is assured between said magnet and said magneto-electric converter element; and said electrical connective terminals are projected from an end face of said synthetic resin holder at a side of said magnet and is connected electrically to said circuit board of said magneto-electric converter element.

3. A revolution sensor, having a magneto-electric converter element and a magnet for establishing a magnetic field for said magneto-electric converter element, a change in the magnetic field being caused by revolution of a rotor of magnetic material being outputted by said magneto-electric converter element as an electrical signal, electrical connective terminals for an input use and an output use of said magneto-electric conversion element and said magnet are insert molded to a synthetic resin holder; and at least one part of one end face at a side which is arranged oppositely to said magnet with said rotor of magnetic material is covered by one end of said synthetic resin holder, at an outer face of a covering part a circuit board on which said magneto-electric converter element is mounted is installed, and further said covering part is between said magnet and said magneto-electric converter element, whereby a predetermined gap is assured between said magnet and said magneto-electric converter element; and said electrical connective terminals are projected from an end face of said synthetic resin holder at a side of said magnet and is connected electrically to said circuit board of said magneto-electric converter element, wherein one part of said end face of said magnet at a side where said synthetic resin holder is covered by said covering part of said synthetic resin holder is left expressed by said covering part, and one part of an outer peripheral face of said magnet which intersects said exposed one part of said end face of said magnet is exposed.

4. In a revolution sensor having a magneto-electric converter element and a magnet for establishing a magnetic field for said magneto-electric converter element, a change in the magnetic field caused by revolution of a rotor of magnetic material being outputted by said magneto-electric converter element as an electrical signal, electrical connective terminals for an input use and an output use of said magneto-electric conversion element and said magnet are insert molded to a synthetic resin holder, said magnet is provided on one end of said synthetic resin holder, one end of said electrical connective terminal is projected from one end at a side where said magnet is installed to said synthetic resin holder and connected electrically to a circuit board on which said magneto-electric converter element is mounted and is installed one end part of said synthetic resin holder; and at least three electrical connective terminals of said electrical connective terminals are arranged in one row, one end at a side where these electrical connective terminals are connected to said circuit board is soldered by passing through each of holes for catching terminal which is provided on said circuit board, and among these electrical connective terminals to two both sides a board receiving part is provided by contacting one part thereof to a rear face of said circuit board.

5. A revolution sensor according to claim 2, wherein one end at an opposing side to a side where said electrical connective terminals are connected to said circuit board is constituted of a pin terminal for a connector use by projecting said one end into an inner portion of a connector part for outside connection use which is molded integrally to said synthetic resin holder.

6. A revolution sensor according to claim 2, wherein one end at an opposing side to a side where said electrical connective terminals are connected to said circuit board is projected to a lead wire introduction part which is molded integrally to said synthetic resin holder, and to said lead wire introduction part one end of a lead wire having another connector is introduced and is connected to said electrical connective terminal.

7. A revolution sensor according to claim 3, wherein one end at an opposing side to a side where said electrical connective terminals are connected to said circuit board is constituted of a pin terminal for a connector use by projecting said one end into an inner portion of a connector part for outside connection use which is molded integrally to said synthetic resin holder.

8. A revolution sensor according to claim 4, wherein one end at an opposing side to a side where said electrical connective terminals are connected to said circuit board is constituted of a pin terminal for a connector use by projecting said one end into an inner portion of a connector part for outside connection use which is molded integrally to said synthetic resin holder.

9. A revolution sensor according to claim 3, wherein one end at an opposing side to a side where said electrical connective terminals are connected to said circuit board is projected to a lead wire introduction part which is molded integrally to said synthetic resin holder, and to said lead wire introduction part one end of a lead wire having another connector is introduced and is connected to said electrical connective terminal.

10. A revolution sensor according to claim 4, wherein one end at an opposing side to a side where said electrical connective terminals are connected to said circuit board is projected to a lead wire introduction part which is molded integrally to said synthetic resin holder, and to said lead wire introduction part one end of a lead wire having another connector is introduced and is connected to said electrical connective terminal.

* * * * *